(12) United States Patent
Matsuda et al.

(10) Patent No.: US 7,501,040 B2
(45) Date of Patent: Mar. 10, 2009

(54) PNEUMATIC TIRE AND METHOD OF SCRAPPING THE SAME

(75) Inventors: Jun Matsuda, Hiratsuka (JP); Yoshiaki Hashimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 53 days.

(21) Appl. No.: 11/707,995

(22) Filed: Feb. 20, 2007

(65) Prior Publication Data

US 2007/0144655 A1    Jun. 28, 2007

Related U.S. Application Data

(62) Division of application No. 10/859,351, filed on Jun. 3, 2004, now abandoned.

(30) Foreign Application Priority Data

Jun. 4, 2003    (JP) .............................. 2003-158912

(51) Int. Cl.
*B32B 38/10* (2006.01)
(52) U.S. Cl. ....................... 156/344; 29/403.3; 29/426.6
(58) Field of Classification Search ................ 156/344, 156/584, 95; 264/36.14; 29/403.3, 426.4, 29/426.6
See application file for complete search history.

(56) References Cited

U.S. PATENT DOCUMENTS

| 3,910,332 A | | 10/1975 | Felker | |
|---|---|---|---|---|
| 4,004,693 A | * | 1/1977 | Tsuji et al. | ................... 209/538 |
| 4,889,173 A | | 12/1989 | Mathews | |
| 5,226,999 A | | 7/1993 | Dugas | |
| 5,683,038 A | * | 11/1997 | Shinal | ........................... 241/1 |
| 2004/0244898 A1 | | 12/2004 | Matsuda et al. | |

FOREIGN PATENT DOCUMENTS

| DE | 122811 | 8/1966 |
|---|---|---|
| DE | 2118748 | 11/1972 |
| EP | 0 206 976 A2 | 12/1986 |
| EP | 0 207 878 | 1/1987 |
| GB | 2 085 494 A | 4/1982 |
| GB | 2 212 456 A | 7/1989 |
| JP | 05-154939 A | 6/1993 |
| JP | 2001-246910 A | 9/2001 |

* cited by examiner

*Primary Examiner*—Mark A Osele
(74) *Attorney, Agent, or Firm*—Greer, Burns & Crain, Ltd.

(57) ABSTRACT

A pneumatic tire which facilitates separation of a rubber layer and is excellent in recyclability and retreadability and a method of scrapping the same. A pneumatic tire comprises a partition layer buried adjacent to a rubber layer, the partition layer including at least one cord repeatedly bent to turn around at its bent portion and arranged in a plane and rubber portions interposed between adjacent portions of the cord. Herein, the cord is arranged in a direction intersecting with the tire circumferential direction. The cord of the partition layer is pulled in an in-plane direction of the partition layer to sequentially cut the rubber portions interposed between the adjacent portions of the cord. The rubber layer adjacent to the partition layer is thus separated.

3 Claims, 4 Drawing Sheets

PNEUMATIC TIRE AND METHOD OF SCRAPPING THE SAME

This is a divisional of application Ser. No. 10/859,351, filed Jun. 3, 2004 now abandoned, the entire contents of which is hereby incorporated by reference.

BACKGROUND OF THE INVENTION

The present application claims priority based on Japanese Patent Application No. 2003-158912, filed Jun. 4, 2003, the entirety of which is being incorporated herein by reference.

The present invention relates to a pneumatic tire taking into consideration recycling and retreading and to a method of scrapping the same. Specifically, the present invention relates to a pneumatic tire which facilitates separation of a rubber layer and to a method of scrapping the same.

In recent years, recycling of waste products is considered important. In order to increase the recycling rate without deteriorating physical properties of reclaimed materials, different materials require to be separated so as not to be mixed with each other. Moreover, separating materials requires being easy in order to save recycling costs and processing time.

A general pneumatic tire is composed of a rubber material and a cord of steel, organic fibers, or the like. Such a pneumatic tire has problems in recycling as follows.

Generally, tires are cut into pieces, and then materials thereof are separated from each other. The steel cord can be physically separated. However, the organic fiber cord is shredded and mixed into rubber, and different types of rubber are mixed with each other. Therefore, an installation is required which performs an aftertreatment for shredded rubber and separates the shredded rubber, and a lot of time is required for the aftertreatment. Moreover, mixture of a material with lower physical properties degrades the physical properties of reclaimed material.

On the other hand, another method is conceived in which a material softening at high temperature is placed between members and heated at high temperature in recycling to separate the members. However, in this case, the reclaimed material could be degraded by heating.

Meanwhile, a method (for example, see Japanese Patent Laid-Open Publication No. 5-154939) has been proposed, in which a cord is spirally wound and buried in a tread portion at 0 degree with respect to the tire circumferential direction and the cord is pulled out in the transverse direction.

However, in such a structure that the rubber layer is separated using the cord at 0 degree with respect to the tire circumferential direction, the circumferential elongation of the tire depends on the elongation of the cord, and the allowable amount of elongation thereof is limited. Therefore, the aforementioned separate structure is limited to only application to a portion which is elongated by a small amount in a tire building process. Moreover, to spirally wind the cord in the tire circumferential direction, it is required to continuously wind the cord, in a tire building process, leading to low productivity.

SUMMARY OF THE INVENTION

An object of the present invention is to provide a pneumatic tire which facilitates separation of the rubber layer and is excellent in recyclability and retreadability.

A pneumatic tire according to the present invention to achieve the aforementioned object includes a partition layer buried adjacent to a rubber layer. The partition layer includes at least one cord repeatedly bent so as to turn around at it bent portion and arranged in a plane and rubber portions interposed between adjacent portions of the cord. Herein, the cord is arranged in a direction intersecting with the tire circumferential direction.

A method of scrapping a pneumatic tire according to the present invention to achieve the aforementioned object is a method of scrapping the above pneumatic tire including the partition layer. In the method, a rubber layer adjacent to the partition layer is separated by pulling out the cord of the partition layer in an in-plane direction of the partition layer to sequentially cut rubber portions interposed between adjacent portions of the cord. Note that the direction that the cord is pulled out is not strictly limited as long as the cord is permitted to be pulled out while the rubber portions interposed between the adjacent portions of the cord are cut.

In the present invention, in recycling or retreading the pneumatic tire, the cord of the partition layer is pulled out in the in-plane direction of the partition layer to sequentially cut the rubber portions interposed between the adjacent portions of the cord. Thus, the rubber layer adjacent to the partition layer can be easily separated.

In addition, the cord constituting the partition layer extends in a direction intersecting with the tire circumferential direction. Accordingly, the aforementioned separate structure can be applied to a portion which is subjected to large elongation deformation in the tire circumferential direction in the tire building process. Moreover, it is possible to previously manufacture the partition layer covered with rubber and incorporate the manufactured partition layer into an uncured tire in the tire building process. Therefore, the productivity of the pneumatic tire is not reduced.

In the present invention, to allow sufficient elongation deformation in the tire circumferential direction in the tire building process, the cord constituting the partition layer is arranged at an angle of, preferably, between 10 and 90 degrees with respect to the tire circumferential direction. Moreover, to facilitate the operation of separating the rubber layer, the distances between adjacent portions of the cord of the partition layer is, preferably, not more than 5 mm, and more preferably, not more than 3 mm.

In the aforementioned pneumatic tire, it is desired that a pulling end of the cord of the partition layer can be easily find. Therefore, it is preferable to indicate an end position of the cord in the tire surface or expose a part of the cord in the tire surface. Alternatively, it is preferable to form a projection in the tire surface and bury part of the cord in the projection.

BRIEF DESCRIPTION OF THE DRAWINGS

FIG. 2A is a cross-sectional view before the pneumatic tire is torn, and FIG. 2B is a cross-sectional view after the pneumatic tire is torn.

DETAILED DESCRIPTION OF THE PREFERRED EMBODIMENTS

A description will be given of a configuration of the present invention in detail below with reference to the drawings.

Figure 1:
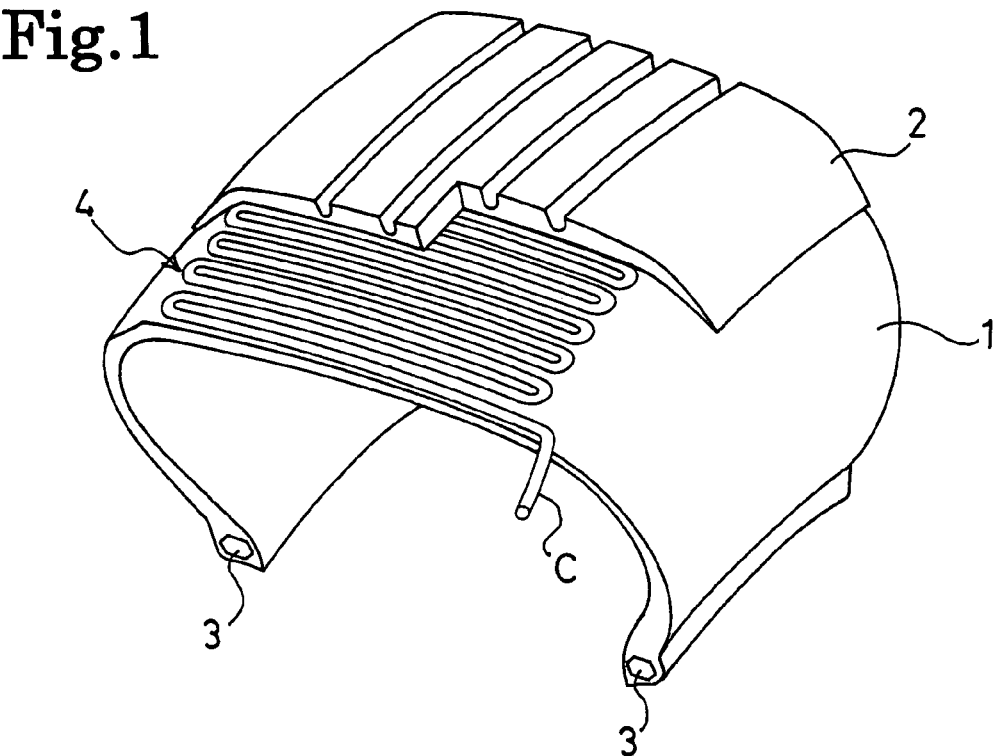
FIG. 1 is a perspective cross-sectional view showing a pneumatic tire according to an embodiment of the present invention.

FIG. 1 shows a pneumatic tire according to an embodiment of the present invention. In FIG. 1, reference numerals 1 denotes a tire body; 2, a tread rubber layer; and 3, an annular bead core which is buried in a bead portion of the tire body 1. In the tire body 1, reinforcement layers such as a carcass layer and a belt layer are omitted in the drawing.

As shown in FIG. 1, a planar partition layer 4 is buried between the tire body 1 and the tread rubber layer 2. This partition layer 4 includes at least one cord C which extends in a direction intersecting with the tire circumferential direction and is repeatedly bent so as to turn around at its bent portion. Especially, an arrangement angle of the cord C relative to the tire circumferential direction is set to a range of 10 to 90 degrees, and the distances between adjacent portions of the cord C in the partition layer 4 are set to not more than 5 mm.

Figure 2:
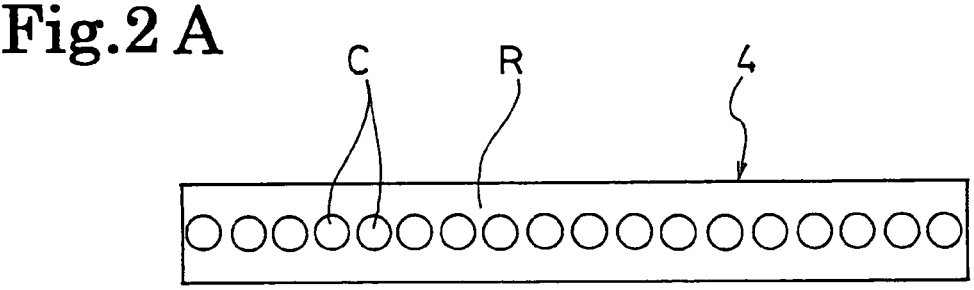
FIGS. 2A and 2B show a partition layer extracted from the pneumatic tire of FIG. 1.
Figure 2:
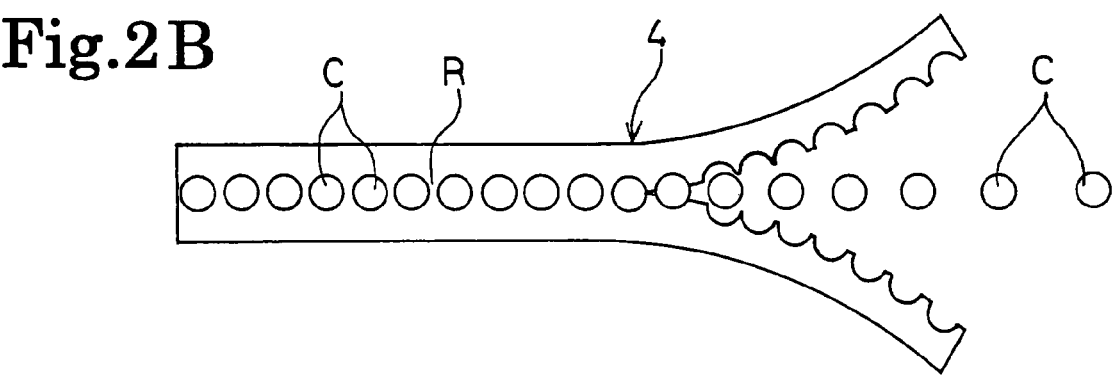

FIGS. 2A and 2B show the partition layer extracted. The partition layer 4 is buried in the tire with rubber portions R interposed between adjacent portions of the cord C. On the other hand, in scrapping the tire, the partition layer 4 is torn by pulling out the cord C such that the rubber portions R are cut, as shown in FIG. 2B.

Figure 3:
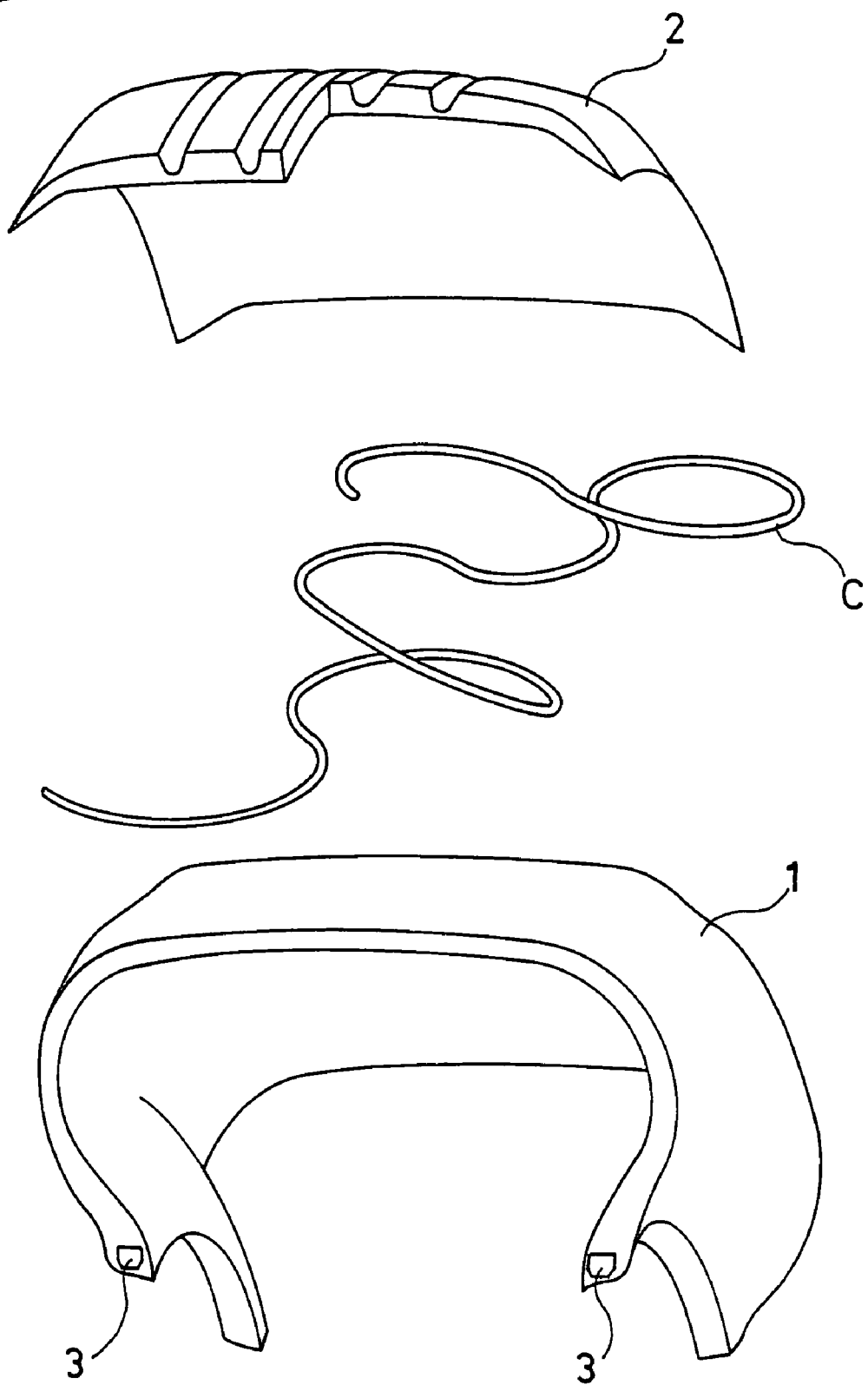
FIG. 3 is a perspective cross-sectional view showing a state where a tread rubber layer is separated from the pneumatic tire of FIG. 1.

When scrapping the pneumatic tire thus structured, first, the end of the cord C of the partition layer 4 is exposed, and part of the tread rubber layer 2 is removed from the tire surface to the depth of the cord surface in the partition layer 4 in a direction where the cord C extends. Subsequently, the cord C is pulled in the tire circumferential direction or a similar direction. Accordingly, the rubber portions interposed between the adjacent portions of the cord C can be sequentially cut, and the tread rubber layer 2 adjacent to the partition layer 4 can be easily separated (see FIG. 3). Herein, if the distances between adjacent portions of the cord C of the partition layer 4 are more than 5 mm, the workability is lowered in separating the rubber layer.

In the case of retreading, the partition layer 4 is provided between the belt layer of the tire body 1 and the tread rubber layer 2, and the separate interface therebetween is properly roughened. Accordingly, there is an advantage that it is not necessary to perform surface cutting or surface roughening for the tire body 1 as a pretreatment for the retreading.

The aforementioned pneumatic tire is excellent not only in recyclability and retreadability but also is advantageous in manufacturing. Specifically, since the cord C constituting the partition layer 4 extends in a direction intersecting with the tire circumferential direction, the partition layer 4 can follow the elongation deformation in a portion of the tire which is subjected to large elongation deformation in the tire circumferential direction in the tire building process. For example, as in the case of the belt layer, when the cord angle with respect to the tire circumferential direction is 10 degrees or more but less than 54.7 degrees, the partition layer 4 can follow the elongation deformation in the tire circumferential direction since the cord angle can change toward 0 degree in accordance with the elongation deformation. When the cord angle with respect to the tire circumferential direction is 54.7 degrees or more but less than 90 degrees, the partition layer 4 can follow the elongation deformation in the tire circumferential direction since the cord angle can change toward 90 degree in accordance with the elongation deformation in the tire circumferential direction. When the cord angle is 54.7 or 90 degrees, the partition layer 4 can deform in such a manner that the distances between adjacent portions of the cord are increased in accordance with the elongation deformation in the tire circumferential direction. Therefore, the aforementioned separate structure can be applied to the portion which is subjected to large elongation deformation in the tire building process. When the angle at which the cord C constituting the partition layer 4 is arranged is less than 10 degrees with respect to the tire circumferential direction, the capability following the elongation deformation is lowered.

Moreover, with respect to the aforementioned separate structure, it is possible to previously manufacture the partition layer 4 covered with rubber and then incorporate the manufactured partition layer 4 into an uncured tire in the tire building process. Specifically, the sheet-shaped partition layer 4 including the cord C repeatedly bent so as to turn around at its bent portion and arranged in the direction intersecting with the tire circumferential direction is previously manufactured. The manufactured partition layer 4 should be only wound around a tire-building drum used in the tire building process. Therefore, the productivity of the pneumatic tire is not reduced unlike the conventional case where the cord is wound in spiral in the tire circumferential direction.

Figure 4:
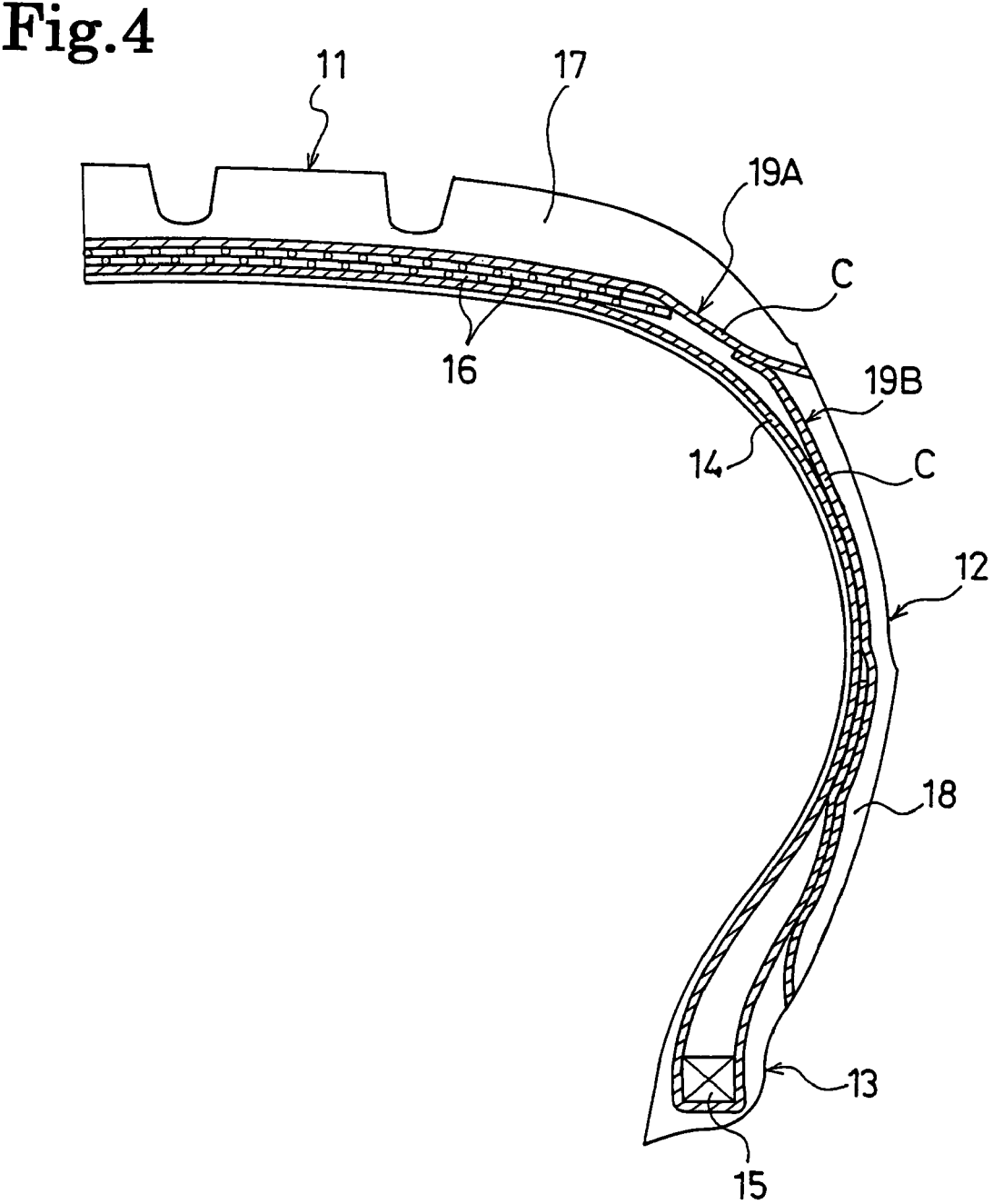
FIG. 4 is a view showing half of the meridian cross section of the pneumatic tire according to another embodiment of the present invention.

FIG. 4 shows a pneumatic tire according to another embodiment of the present invention. In FIG. 4, reference numeral 11 denotes a tread portion; 12, a sidewall portion; and 13, a bead portion. As shown in FIG. 4, a carcass layer 14 is laid between a pair of the right and left bead portions 13, and an end of the carcass layers 14 is folded around a bead core 15 from the inside of the tire to the outside thereof. A belt layer 16 is buried in the tread portion 11 on the outer peripheral side of the carcass layer 14. Reference numerals 17 and 18 denote a tread rubber layer and a sidewall rubber layer, respectively.

In the aforementioned pneumatic tire, planar partition layers 19A and 19B are buried between the belt layer 16 and the tread rubber layer 17 and between the carcass layer 14 and the sidewall rubber layer 18, respectively. Each of these partition layers 19A and 19B includes at least one cord C extending in a direction intersecting with the tire circumferential direction and is repeatedly bent so as to turn around at its bent portion. Especially, the arrangement angle of the cord C with respect to the tire circumferential direction is set to a range of 10 to 90 degrees, and the distances between adjacent portions of the cord C in the partition layers 19A and 19B are set to 5 mm or less. In the partition layers 19A and 19B, rubber portions are interposed between adjacent portions of the cord C.

In the partition layer 19A disposed between the belt layer 16 and the tread rubber layer 17, an edge portion thereof on the outside in the tire width direction extends to the sidewall side and is brought into contact with an edge portion of the partition layer 19B. Therefore, when the belt layer 16 and the tread rubber layer 17 are separated by the partition layer 19A, the edge portion of the partition layer 19B is exposed.

When recycling the pneumatic tire thus structured, the end of the cord C of the partition layer 19A is exposed, and then part of the tread rubber layer 17 is removed from the tire surface to the depth of the cord surface in the partition layer 19A in the direction where the cord C extends. Subsequently, the cord C is pulled out in the tire circumferential direction or a similar direction. Accordingly, the rubber portions interposed between adjacent portions of the cord C are sequentially cut, and the tread rubber layer 17 adjacent to the partition layer 19A can be easily separated.

Thereafter, the end of the cord C of the partition layer 19B is exposed, and then part of the sidewall rubber layer 18 is removed from the tire surface to the depth of the cord surface in the partition layer 19B in the direction where the cord C extends. Subsequently, the cord C is pulled out in the tire circumferential direction or a similar direction. Accordingly, the rubber portions interposed between adjacent portions of the cord C are sequentially cut, and the sidewall rubber layer 18 adjacent to the partition layer 19B can be easily separated.

As described above, the partition layer to separate the rubber layer can be disposed at any place of the pneumatic tire, for example, between the belt layer and the carcass layer in addition to the aforementioned places.

FIGS. 5 to 9 show structures that a cord constituting the partition layer is buried. These structures that a cord is buried are designed to facilitate finding of a pulling end of the cord.

Figure 5:
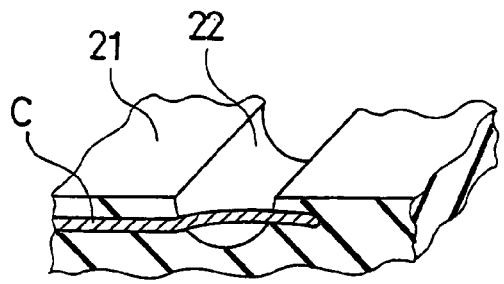
FIG. 5 is a perspective cross-sectional view showing an example of a structure that a cord constituting a partition layer is buried.
Figure 6:
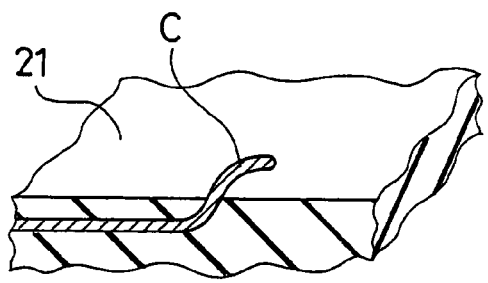
FIG. 6 is a perspective cross-sectional view showing an example of the structure that the cord constituting the partition layer is buried.

In FIG. 5, a groove 22 is formed in a tire surface 21, and the cord C constituting the partition layer is buried so as to cross the groove 22. Therefore, part of the cord C is exposed to the tire surface 21. In FIG. 6, the end of the cord C is protruded from the tire surface 21.

Figure 7:
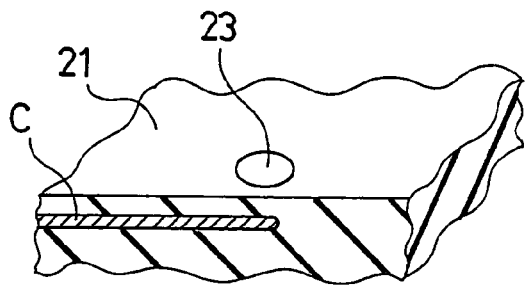
FIG. 7 is a perspective cross-sectional view showing an example of the structure that the cord constituting the partition layer is buried.
Figure 8:
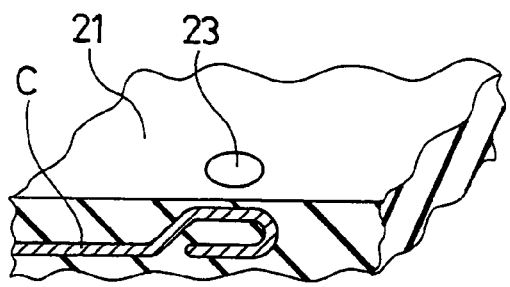
FIG. 8 is a perspective cross-sectional view showing an example of the structure that the cord constituting the partition layer is buried.

In FIG. 7, a marking 23 to display a position of the end of the cord C is provided on the tire surface 21. Such marking can be formed of rubber colored with color other than black or can be formed by printing. Alternatively, the direction where the cord C extends may be stamped with an arrow. In FIG. 8, the end of the cord C is disposed while assuming a loop shape in the vicinity of the marking 23. Accordingly, the end of the cord C is easily pulled out. Moreover, the direction where the cord C extends may be indicated by stamping or marking numbers and characters in the tire surface 21.

Figure 9:
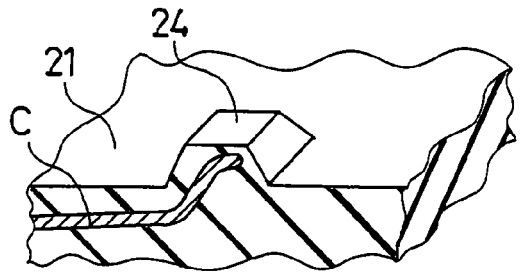
FIG. 9 is a perspective cross-sectional view showing an example of the structure that the cord constituting the partition layer is buried.

In FIG. 9, a projection 24 is formed in the tire surface 21, and the end of the cord C is buried in the projection 24. Accordingly, the end of the cord C can be easily found by cutting the projection 24.

In the present invention, the code constituting the partition layer may be one or two or three codes may be used while laying them side by side. Specifically, the partition layer may be formed by bending one code repeatedly so as to turn around. Alternatively the partition layer may be formed by laying two or three cords side by side and by bending them repeatedly so as to turn around. Moreover, though the partition layer may be continuously formed in the tire circumferential direction, the partition layer may be divided in the tire circumferential direction. Specifically, a plurality of the partition layers may be circularly disposed to be adjacent to each other in the tire circumferential direction.

The material of the cord constituting the partition layer is not particularly limited, and any one of a steel cord and an organic fiber cord can be used for the cord. Since the main object of the cord is to separate the rubber layer, the organic fiber cord is preferably used for weight reduction. The cord may be either twisted or untwisted and may be either a monofilament or multifilament cord. Moreover, the cord may be formed to be a wave shape or a spiral shape. The cord should only have strength to the extent that the cord is not cut before tearing the rubber portions. Moreover, the cross-sectional shape of the cord may be a circle or an ellipse. While the cord constituting the partition layer is bent so as to turn around at its bent portion and arranged substantially in parallel, another cord may be woven into the cord arranged in parallel. In this case, the cord constituting the partition layer should be only designed to have breaking strength greater than that of another woven cord.

The preferred embodiment of the present invention has been described above in detail. It should be understood that various modifications, substitutions, and replacements can be made without departing from the spirit and the scope of the present invention specified by the appended claims.

According to the present invention, the partition layer is buried in an interface of the rubber layer. Herein, the partition layer includes a cord which is repeatedly bent so as to turn around at its bent portion and arranged into a plane and rubber portions interposed between adjacent portions of the cord. The direction that the cord is arranged intersects with the tire circumferential direction. Accordingly, the rubber layer can be easily separated, and a pneumatic tire excellent in recyclability and retreadability can be provided.

The aforementioned separate structure can be applied to a portion which is subjected to large elongation deformation in the tire circumferential direction in the tire building process since the cord constituting the partition layer extends in the direction intersecting with the tire circumferential direction. Furthermore, it is possible to previously manufacture the partition layer covered with rubber and incorporate the partition layer into an uncured tire in the tire building process unlike the case where the cord is wound in a spiral in the tire circumferential direction. Accordingly, the productivity of the pneumatic tire is not reduced.

What is claimed is:

1. A method of scrapping a pneumatic tire, the pneumatic tire having a partition layer buried adjacent to a rubber layer, the partition layer including at least one cord repeatedly bent so as to turn around at its bent portion and arranged in a plane and rubber portions interposed between adjacent portions of the cord, a direction that the cord is arranged intersecting with the tire circumferential direction, the method comprising the steps of:
pulling out the cord of the partition layer in an in-plane direction of the partition layer so that the cord traverses between the bent portions;
separating a rubber layer adjacent to the partition layer by sequentially cutting rubber portions interposed between adjacent portions of the cord.

2. The method according to claim 1, wherein an angle at which the cord is disposed ranges from 10 to 90 degrees with respect to the tire circumferential direction.

3. The method according to claim 1, wherein distances between the adjacent portions of the cord of the partition layer are not more than 5 mm.

* * * * *